(12) United States Patent
Johnson et al.

(10) Patent No.: US 6,477,010 B1
(45) Date of Patent: Nov. 5, 2002

(54) DATA STORAGE TAPE CARTRIDGE WITH MISINSERTION NOTCHES

(75) Inventors: Michael W. Johnson, Cottage Grove, MN (US); Leon C. Oenes, Broomfield, CO (US); Thomas D. Steury, Longmount, CO (US)

(73) Assignees: Imation Corp., Oakdale, MN (US); Storage Technology Corp., Louisville, CO (US)

( * ) Notice: Subject to any disclaimer, the term of this patent is extended or adjusted under 35 U.S.C. 154(b) by 0 days.

(21) Appl. No.: 09/484,304

(22) Filed: Jan. 18, 2000

(51) Int. Cl.$^7$ .............................................. G11B 15/675
(52) U.S. Cl. ..................................................... 360/132
(58) Field of Search ................................ 360/132, 96.5; 242/238.1, 342, 344, 338.1, 338.4

(56) References Cited

U.S. PATENT DOCUMENTS

| | | | |
|---|---|---|---|
| 4,014,042 A | * 3/1977 | Schoettie et al. ............ 242/338 |
| 4,701,817 A | * 10/1987 | Uemura ...................... 360/96.5 |
| 4,742,416 A | * 5/1988 | Oishi et al. ................. 360/132 |
| 4,908,817 A | 3/1990 | Sandell et al. .............. 369/291 |
| 5,209,425 A | 5/1993 | Krabbenhoft et al. ....... 242/195 |
| 5,348,243 A | 9/1994 | Ohmachi et al. ........... 242/342 |
| 5,547,142 A | 8/1996 | Cheatham et al. ....... 242/338.1 |
| 5,699,216 A | * 12/1997 | Doty ........................... 360/132 |
| 5,722,610 A | 3/1998 | Smith et al. ................ 242/342 |
| 5,797,556 A | * 8/1998 | Kikuchi ...................... 242/340 |
| 5,870,246 A | 2/1999 | Hoelsaeter ................. 360/96.5 |
| 5,969,913 A | 10/1999 | Vanderheyden et al. .... 360/132 |
| 6,069,777 A | 5/2000 | Vanderheyden et al. .... 360/132 |
| 6,166,882 A | * 12/2000 | Solhjell ...................... 360/132 |
| 6,205,001 B1 | * 3/2001 | Vanderheyden et al. . 242/338.4 |

FOREIGN PATENT DOCUMENTS

WO    WO 95/31811    11/1995

* cited by examiner

Primary Examiner—Brian E. Miller
Assistant Examiner—Chen Tianjie
(74) Attorney, Agent, or Firm—Dicke, Billig & Czaja, P.A.

(57) ABSTRACT

A data storage tape cartridge including a housing, at least one tape reel, and a storage tape. The housing defines a top face, a bottom face, a front, a back, and opposing sides. Further, the housing forms a tape identification notch, a write-select notch, a first misinsertion notch, and a second misinsertion notch. The tape identification notch extends from the front of the housing along one of the opposing sides. The write-select notch is formed in the front of the housing and is configured to maintain an insert piece. The first misinsertion notch is formed in the front of the housing and is configured for clearance about a tape drive switch. Similarly, the second misinsertion notch is formed in the front of the housing and is configured for clearance about a tape drive switch. The first and second misinsertion notches are substantially aligned. The at least one tape reel is rotatably disposed within the housing. Finally, the storage tape is maintained by the at least one tape reel. Upon accidental insertion of the data storage tape cartridge into an incompatible tape drive, one of the cartridge misinsertion notches will extend about or clear an associated cartridge present switch, thereby preventing activation of the incompatible tape drive.

13 Claims, 4 Drawing Sheets

DATA STORAGE TAPE CARTRIDGE WITH MISINSERTION NOTCHES

BACKGROUND OF THE INVENTION

The present invention relates to a data storage tape cartridge. More particularly, it relates to a data storage tape cartridge including misinsertion notches configured to prevent activation of incompatible tape drives.

Data storage tape cartridges have been used for decades in the computer, audio, and video fields. The data storage tape cartridge continues to be an extremely popular device for recording and storing large volumes of information for subsequent retrieval and use.

A data storage tape cartridge generally consists of an outer shell or housing maintaining at least one tape reel and a length of magnetic storage tape. The storage tape is wrapped about a hub portion of the tape reel that, in turn, is rotatably disposed within the housing. The housing normally includes a separate cover and base, the combination of which forms an opening (or window) at a forward portion thereof for allowing access to the storage tape upon insertion of the data storage tape cartridge into a tape drive. The tape drive includes transducers, such as a magnetic read/write head, for recording data to, or reading data from, the storage tape. This interaction between storage tape and head may take place within the housing (for example, with a mid-tape load design), or the storage tape be directed away from the housing to an adjacent area within the tape drive at which the read/write head is located (for example, with a helical drive design or a leader block design). Where the tape cartridge/drive system is designed to direct the storage tape away from the housing, the data storage tape cartridge typically includes a single tape reel. Conversely, where the tape cartridge/drive system is designed to provide head/storage tape interaction within or very near the housing, a two- or dual-tape reel assembly configuration is utilized.

Data storage tape cartridge and tape drive manufactures have, over the years, established industry "standard" sizes or form factors for cartridges and drives, based upon cartridge housing peripheral dimensions. Due in large part to customer preferences, most new or improved cartridge designs adhere to these same "standard" housing sizes. Thus, while technological advancements in storage tape, read/write heads, tape reels, etc., have combined to dramatically improve data storage tape cartridge capabilities, cartridge housing sizes for particular product lines have essentially remained unchanged.

Often times, an improved data storage tape cartridge design (or version) for a particular product line will not be compatible with an older version tape drive. For example, a new version data storage tape cartridge may include a storage tape providing greatly reduced sized storage tracks. An older version tape drive may utilize read/write head technology that cannot locate and/or follow the reduced-sized data tracks associated with improved storage tape, and is therefore incompatible. Unfortunately, because the newer version data storage tape cartridge utilizes a housing identical in size to previous versions, it may be possible for a user (or machine) to inadvertently insert the newer version data storage tape cartridge into the older, incompatible tape drive. Under these circumstances, insertion of the data storage tape cartridge activates the tape drive, causing the drive system to engage the tape reel(s) and the read/write head to interact with the storage tape. The above-described incompatibilities prevent the tape drive/cartridge from functioning properly. In fact, the storage tape and/or head may be permanently damaged.

Efforts have been made to incorporate certain design characteristics into corresponding versions of data storage tape cartridges/tape drives that allow the tape drive to "recognize" an acceptable data storage tape cartridge. These same design features prevent undesired and possible damaging activation of a tape drive upon insertion of an incompatible data storage tape cartridge. For example, industry standard 3480-type data storage tape cartridges typically incorporate a tape identification notch formed at a leading corner of the cartridge housing for identifying to the drive whether the inserted cartridge contains a magnetic storage tape or a cleaning tape. Similarly, the cartridge will include a write-select notch slidably maintaining an indictor block allowing a user to prevent the tape drive from "writing" onto the storage tape. Finally, most currently available tape drives, such as, for example, Storage Technology Corp., incorporate one or more electrical switches or sensors positioned adjacent the area of the tape drive at which the cartridge is inserted. These sensors effectively serve as "cartridge present" switches. When contacted by the data storage tape cartridge, the switch prompts positive activation or deactivation of the tape drive, depending upon a preprogrammed response. A compatible data storage tape cartridge may or may not incorporate a corresponding cartridge misinsertion notch positioned to desirably contact or not contact ("clear") the cartridge present switch.

The cartridge present switch/cartridge misinsertion notch relationship has evolved over time. Currently, a common tape drive configuration incorporates two vertically arranged cartridge present switches. The upper switch is intended to detect incompatible cartridges, whereas the lower switch serves as a tape drive activation prompt. The corresponding, compatible data storage tape cartridge incorporates a single cartridge misinsertion notch corresponding with the upper cartridge present switch. In particular, the housing cover forms a notch sized for clearance about the upper cartridge present switch. The housing base does not include a cartridge misinsertion notch. Thus, the cartridge misinsertion notch terminates at the housing base. When inserted into the compatible tape drive, the cartridge misinsertion notch "clears" the upper cartridge present switch, such that the tape drive is not positively deactivated. Conversely, however, the cartridge housing does contact the lower cartridge present switch, thereby prompting tape drive activation. Notably, an older version of this tape drive implemented only the upper cartridge present switch, the contacting of which signaled tape drive activation. Thus, insertion of the newer version data storage tape cartridge into the older version, tape drive would not result in tape drive activation as the cartridge misinsertion notch would "clear" the upper cartridge present switch. Conversely, insertion of an incompatible, older version cartridge into the newer version tape drive would result in system deactivation, as the older version cartridge would contact the upper cartridge present switch.

Future version data storage tape cartridge/tape drive designs will, in all likelihood, continue to conform to industry accepted form factor sizes. As such, it will be possible to insert newer version cartridges into currently available tape drives. The improvements associated with the future generation cartridges will likely render them incompatible with currently available tape drives. The single misinsertion notch design will not distinguish the newer version cartridges when used with available tape drives. Therefore, a substantial need exists for a data storage tape cartridge incorporating misinsertion notches configured to prevent activation of incompatible tape drives.

SUMMARY OF THE INVENTION

One aspect of the present invention relates to a data storage tape cartridge including a housing, at least one tape reel, and storage tape. The housing defines a top face, a bottom face, a front, a back, and opposing sides. Further, the housing forms a tape identification notch, a write-select notch, a first misinsertion notch, and a second misinsertion notch. The tape identification notch extends from the front of the housing along one of the opposing sides. The write-select notch is formed in the front of the housing and is, in one preferred embodiment, configured to maintain an insert piece. The first misinsertion notch is formed in the front of the housing, and is configured for clearance about a tape drive cartridge present switch. Similarly, the second misinsertion notch is formed in the front of the housing and is configured for clearance about a tape drive cartridge present switch. In this regard, the first and second misinsertion notches are substantially aligned. The tape reel is rotatably disposed within the housing. Finally, the tape reel maintains the storage tape. Insertion of the above-described data storage tape cartridge into an incompatible tape drive will desirably not activate the tape drive. In particular, with insertion of the data storage tape cartridge into the incompatible tape drive, at least one of the first and second misinsertion notches will clear a cartridge present switch associated with the tape drive, the contact of which would otherwise prompt tape drive activation.

Another aspect of the present invention relates to an improved data storage tape cartridge including a housing, a tape reel, and a storage tape. The housing is formed by a base and a cover each defining a front, a back, and opposing sides. The tape reel is disposed within the housing and is accessible through an opening in the base. The storage tape is maintained by the tape reel. A tape identification notch is formed to extend from the front of the base along one of the opposing sides. A write-select notch and a first misinsertion notch are formed in the front of the cover. With this in mind, the improvement comprises a second misinsertion notch formed in the front of the base. The second misinsertion notch is configured for clearance about a tape drive cartridge present switch and is substantially aligned with the first misinsertion notch. Taken in combination, the first and second misinsertion notches prevent the improved data storage tape cartridge from activating incompatible tape drives.

Yet another aspect of the present invention relates to a data storage tape cartridge configured to prevent activation of a first and a second incompatible tape drive upon accidental insertion of the data storage tape cartridge into either of the incompatible tape drives. The first incompatible tape drive includes a first cartridge receiving frame and a first cartridge present switch. The second incompatible tape drive includes a second cartridge receiving frame and a second cartridge present switch. The cartridge receiving frames are substantially identical, but the cartridge present switches are positioned at different locations relative to the respective cartridge receiving frame. With this in mind, the data storage tape cartridge includes a housing, a tape reel, and a storage tape. The housing is generally sized for insertion within the cartridge receiving frames, and defines a top face, a bottom face, a front, a back, and opposing sides. Further, the housing forms a tape identification notch, a write-select notch, a first misinsertion notch, and a second misinsertion notch. The tape identification notch extends from the front of the housing along one of the opposing sides. The write-select notch is formed in the front of the housing. The first misinsertion notch is formed in the front of the housing and is configured for clearance about the first cartridge present switch. The second misinsertion notch is formed on the front of the housing and is configured for clearance about the second cartridge present switch. The first and second misinsertion notches are substantially aligned. The tape reel is rotatably disposed within the housing. Finally, the storage tape is maintained by the tape reel. With this configuration, upon accidental insertion of the data storage tape cartridge into the first cartridge receiving frame, the first cartridge present switch is not contacted such that the first incompatible tape drive is not activated. Similarly, upon accidental insertion of the data storage tape cartridge into the second cartridge receiving frame, the second cartridge present switch is not contacted such that the second incompatible tape drive is not activated.

DESCRIPTION OF THE PREFERRED EMBODIMENTS

Figure 1:
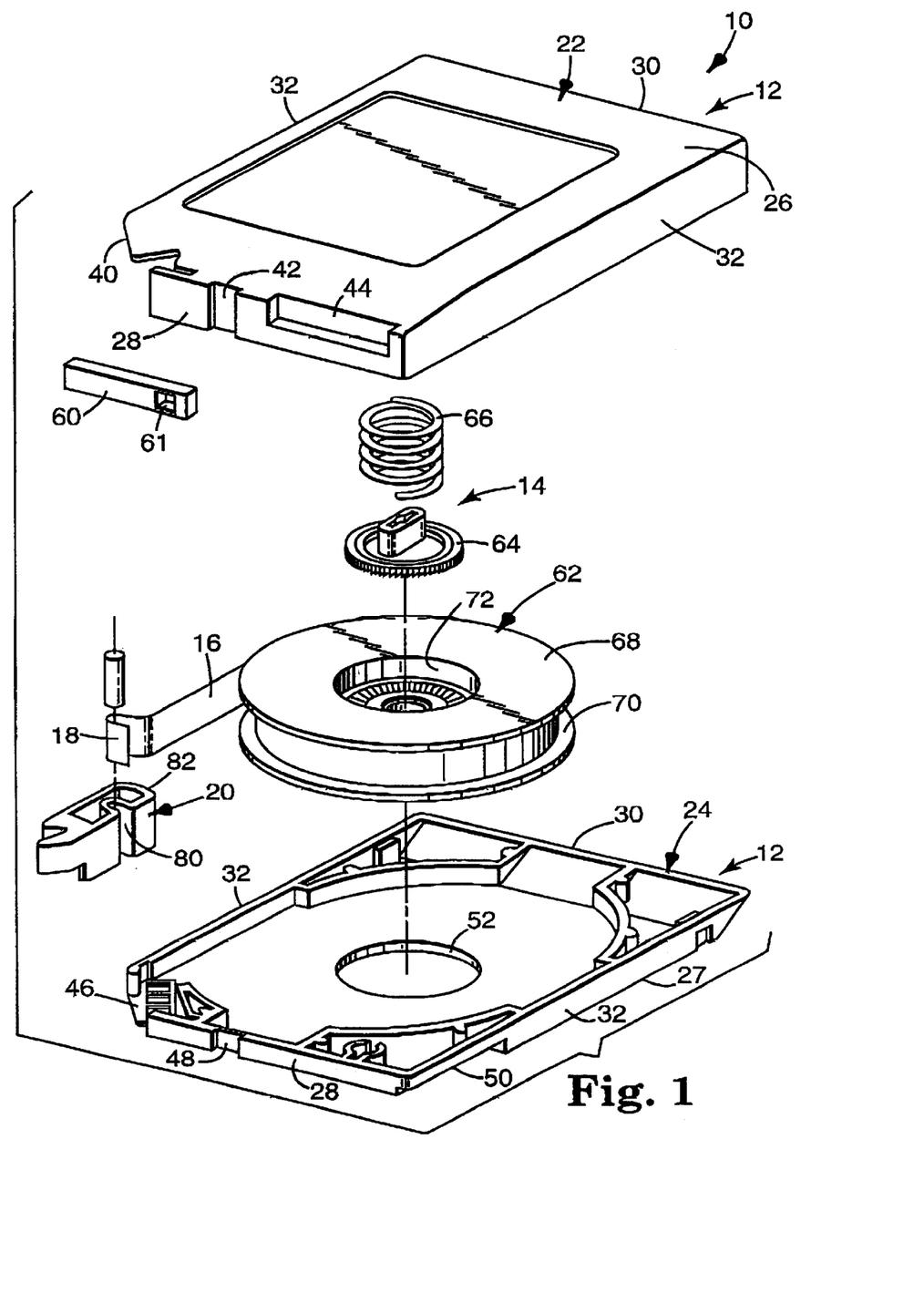
FIG. 1 is an exploded, perspective view of a data storage tape cartridge in accordance with the present invention.

One preferred embodiment of a data storage tape cartridge 10 is shown in FIG. 1. Generally speaking, the data storage tape cartridge 10 includes a housing 12, a tape reel assembly 14, and a storage tape 16. The tape reel assembly 14 is disposed within the housing 12. The storage tape 16, in turn, is wound about a portion of the tape reel assembly 14 and includes a free-end attached to a leader block 20.

The housing 12 is sized in accordance with industry-accepted tape drive form factors. Thus, the housing 12 can assume a form factor size of approximately 125 mm×110 mm×21 mm, although other form factors of dimensions are equally acceptable. With this in mind, the housing 12 is formed by a cover 22 and a base 24 configured to be reciprocally mated to one another. In this regard, the cover 22 forms a top face 26 of the housing 12, whereas the base 24 forms a bottom face 27 (partially hidden in FIG. 1). Further, each of the cover 22 and the base 24 defines a front 28, a back 30, and opposing sides 32. It should be understood that as used throughout this specification, directional terminology, such as "cover," "base," "front," "back," etc., are used for purposes of illustration only, and are in no way limiting.

The cover 22 and the base 24 preferably form a number of different notches or openings. For example, in one preferred embodiment, the cover 22 forms a leader block opening 40, a first misinsertion notch or first misinsertion prevention notch 42, and a write-select notch 44; whereas the base 24 forms a leader block opening 46, a second misinsertion notch or second misinsertion prevention notch 48, a tape identification notch 50, and a central opening 52. Details on each of the features 40–52 are provided below.

The leader block opening 40 is formed at a leading corner of the cover 22, defined by the front 28 and one of the opposing sides 32. The leader block opening 46 is correspondingly formed at a leading corner of the base 24. Upon final assembly, the leader block windows 40, 46 combine to form a window 54 (best shown in FIG. 2). The window 54 holds the leader block 20 and serve as an opening for the storage tape 16 to exit from the housing 12 such that the storage tape 16 can be threaded through a tape drive (not shown) when the leader block 20 is removed from the window 54. Conversely, when the leader block 20 is snapped into the leader block window 54, the leader block window 54 is covered. Alternatively, where the data storage tape cartridge 10 is configured to provide for storage tape interaction within the housing 12 (e.g., mid-tape load design), the window 52 is sized to allow passage of a read/write head (not shown) as the leader block 20 is not used.

The first misinsertion notch 42 is formed in the front 28 of the cover 22, preferably spaced from the opposing sides 32. In a preferred embodiment, the first misinsertion notch 42 extends from (or through) the top face 26 along an entire height defined by the front 28 of the cover 22. So as to maximize an available internal area of the housing 12, the first misinsertion notch 42 is preferably offset from a center of the housing 12. In one preferred embodiment, the first misinsertion notch 42 has a width in the range of 9–13 mm, most preferably 11 mm; a height in the range of 13–17 mm, most preferably 15 mm; and a depth in the range of 3–5 mm, most preferably 4 mm. Alternatively, other dimensional characteristics are acceptable. However, as described in greater detail below, the first misinsertion notch 42 is sized for clearance about a switch (not shown) associated with an incompatible tape drive (not shown).

The write-select notch 44 is similarly formed in the front 28 of the cover 22. The write-select notch 44 is sized to receive an insert piece 60 (shown schematically in FIG. 1), the insert piece 60 forming a passage 61. In one preferred embodiment, the insert piece 60 serves as an indicator block by which a user (not shown) can dictate whether information can or cannot be "written" onto the storage tape 16 upon insertion into a tape drive (not shown) as is known in the art. Examples of several acceptable forms are provided in U.S. Pat. No. 5,239,437, the teachings of which are incorporated herein by reference. Importantly, however, a relationship of the write-select notch 44 and the insert piece 60 is such that upon final assembly, the passage 61 extends to the write-select notch 44 (best shown in FIG. 2), regardless of a position of the insert piece 60. As described below, the passage 61 is sized and positioned for clearance about a write-select detect switch (not shown) associated with an incompatible tape drive (not shown).

The second misinsertion notch 48 is formed in the front 28 of the base 24, preferably offset from the opposing sides 32. In a preferred embodiment, the second misinsertion notch 48 extends from (or through) the bottom face 27 of the base 24 along an entire height defined by the front 28 of the base 24. The second misinsertion notch 48 preferably has a width in the range of 9–13 mm, most preferably 11 mm; a height in the range of 4–8 mm, most preferably 6.5 mm; and a depth in the range of 3–5 mm, most preferably 4 mm. Other dimensional characteristics are equally acceptable such that the second misinsertion notch 48 is sized for clearance about a switch (not shown) associated with an incompatible tape drive (not shown). So as to maximize an available internal area of the housing 12, the second misinsertion notch 48 is preferably offset from a center point of the housing 12. Further, the second misinsertion notch 48 is preferably formed such that upon final assembly, the second misinsertion notch 48 is aligned with the first misinsertion notch 42. With this in mind, in a preferred embodiment, the front 28 of the base 24 has a length (e.g., distance between the opposing sides 32) of approximately 110 mm, and the second misinsertion notch 48 is centered at a distance in the range of 40–50 mm from the left side 32 (relative to the orientation of FIG. 1), most preferably, approximately 46 mm.

The tape identification notch 50 is formed at the front 28 of the base 24, extending along one of the opposing sides 32, opposite the leader block opening 46. Incorporation of the tape identification notch 50 is well-known in the art, and serves to indicate to a type drive (not shown) the type of storage tape, and in particular whether the storage tape 16 is a magnetic data storage tape or a cleaning tape. More particularly, older version (and therefore incompatible) tape drives incorporate a tape confirmation switch that, when contacted, indicates that the inserted cartridge is not a cleaning tape-type cartridge. Therefore, data storage tape cartridges compatible with these older version tape drives do not include a notch similar to the tape identification notch 50, whereas compatible cleaning-type cartridges include a notch similar to the tape identification notch 50. So that the data storage tape cartridge 10 of the present invention will not "trigger" the tape confirmation switch (as described below) of an older, incompatible tape drive, the tape identification notch 50 is preferably formed.

The central opening 52 is formed through the bottom face of the base 24. The central opening 52 facilitates access to the tape reel assembly 14 by a drive chuck portion of a tape drive (not shown).

The tape reel assembly 14 preferably includes a tape reel 62, a brake 64 and a spring 66. The tape reel 62 is generally comprised of an upper flange 68, lower flange 70 and a hub ring 72, and is sized to receive the brake 64 and the spring 66. The storage tape 16 is wound about the hub 72, constrained laterally by the flanges 68, 70. As is known in the art, the brake 64 is slidably connected to a tab (not shown) extending inwardly from the cover 22. Further, the spring 66 biases the brake 64 into selective engagement with a portion of the tape reel 62. In this engaged position, the brake 64 prevents movement of the tape reel 62. During, use, a drive chuck (not shown) directs the brake 64 away from the tape reel 62, such that the tape reel 62 is free to rotate. Alternatively, other configurations for the tape reel assembly 14 known in the art are equally acceptable. Further, more than one of the tape reel assembly 14 can be provided.

The storage tape 16 is preferably a magnetic tape of a type commonly known in the art. For example, the storage tape 16 can consist of a balanced polyethylene naphthalate (PEN) based material coated on one side with a layer of magnetic material dispersed within a suitable binder system, and on the other side with a conductive material dispersed within a suitable binder system. Acceptable magnetic tape is available, for example, from Imation Corp., of Oakdale, Minn.

As previously described, the storage tape 16 terminates in the leader block 20. A front surface of the leader block 20 includes a slot 80 for engaging an automatic threading apparatus of a reel-to-reel magnetic tape drive apparatus (now shown) and engages an inclined surface of the leader block openings 40, 46. A rear surface 82 is rounded to form a portion of an arc of a radius to match the periphery of the take-up hub (not shown) in the tape drive apparatus as the leader block 20 fits into a slot in the take-up hub. A compliant section may be formed on the leader block 20 to permit the leader block 20 to compress at its rear surface to accommodate especially a first layer of the storage tape 16 when the storage tape 16 is wound onto the tape reel assembly 14. Alternatively, the leader block 20 may assume other forms known in the art. Even further, depending upon a desired configuration of the data storage tape cartridge 10, the leader block 20 may be eliminated, such as with a dual tape reel design.

Figure 2:
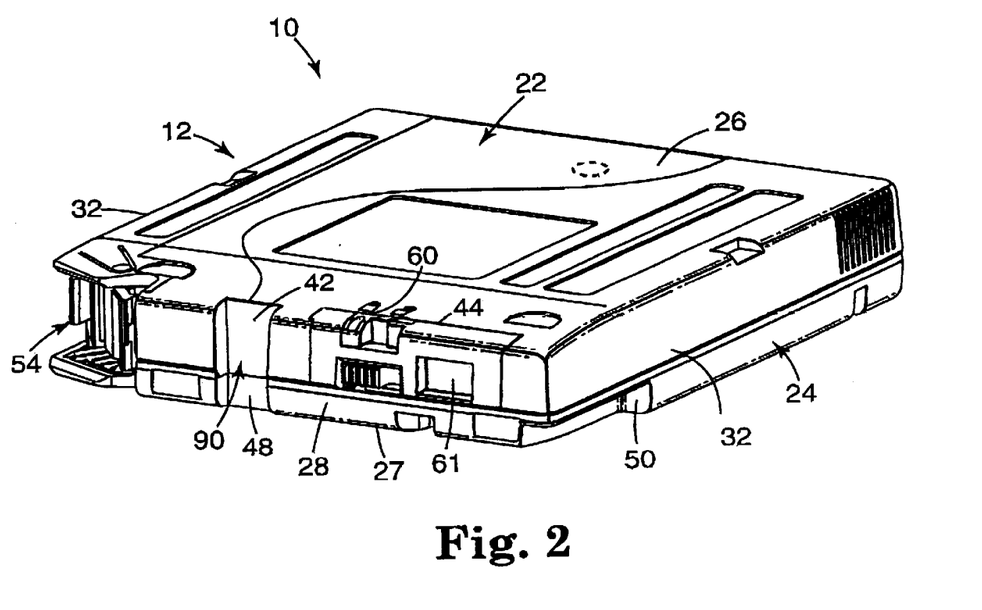
FIG. 2 is a perspective view of the data storage tape cartridge of FIG. 1 upon final assembly.

The data storage tape cartridge 10 is depicted in a final, assembled form in FIG. 2. The first and second misinsertion notches 42, 48 are, as previously described, preferably aligned. In one preferred embodiment, the first and second misinsertion notches 42, 48 form a continuous recess 90 extending from the top face 26 to the bottom face 27. With this one preferred embodiment, the recess 90 has a substantially continuous width in the range of 9–13 mm, most preferably 11 mm; a substantially continuous height in the range of 19–23 mm, most preferably 21 mm; and a substantially continuous depth in the range of 3–5 mm, most preferably 4 mm. Notably, the recess 90 preferably extends through the top face 26 and the bottom face 27.

While the data storage tape cartridge 10 has been preferably described as forming the continuous recess 90, other configurations are equally acceptable. For example, the first and second misinsertion notches 42, 48 need not be completely aligned, but instead can be offset from one another. Further, the first misinsertion notch 42 and/or the second misinsertion notch 48 can be formed so as to be closed at the top face 26 or the bottom face 27, respectively. That is to say, the first misinsertion notch 42 need not extend through the top face 26 and/or the second misinsertion notch 48 need not extend though the bottom face 27. Alternatively or in addition, the first misinsertion notch 42 can be closed relative to the second misinsertion notch 48. For example, the first misinsertion notch 48 need not extend along an entire height of the cover 22. Similarly, the second misinsertion notch 48 need not extend along an entire height of the base 24. For example, material may be formed into the cover 22 and/or the base 24 that separates the first and second misinsertion notches 42, 48 upon final assembly.

The data storage tape cartridge 10, and in particular, the first and second misinsertion notches 42, 48, are configured to prevent unintentional, potentially damaging activation of an incompatible tape drive. One example of an incompatible tape drive 100 is shown schematically in FIG. 3A. The tape drive 100 is known in the art and generally includes a frame 102, a take-up hub 104, a tape confirmation switch 106, a write-select detection switch 108, a cartridge present switch 110 and a processor 112. As is known in the art, the frame 102 is configured to receive a "standard" form-factor data storage tape cartridge associated with a particular product type (such as the data storage tape cartridge 10 of FIG. 1), and maintains the take-up hub 104 and the switches 106–110 at a trailing portion thereof. The take-up hub 104 is known in the art and is configured to selectively engage the leader block 20 (FIG. 1). Finally, the switches 106–110 are electrically connected to the processor 112.

Figure 3A:
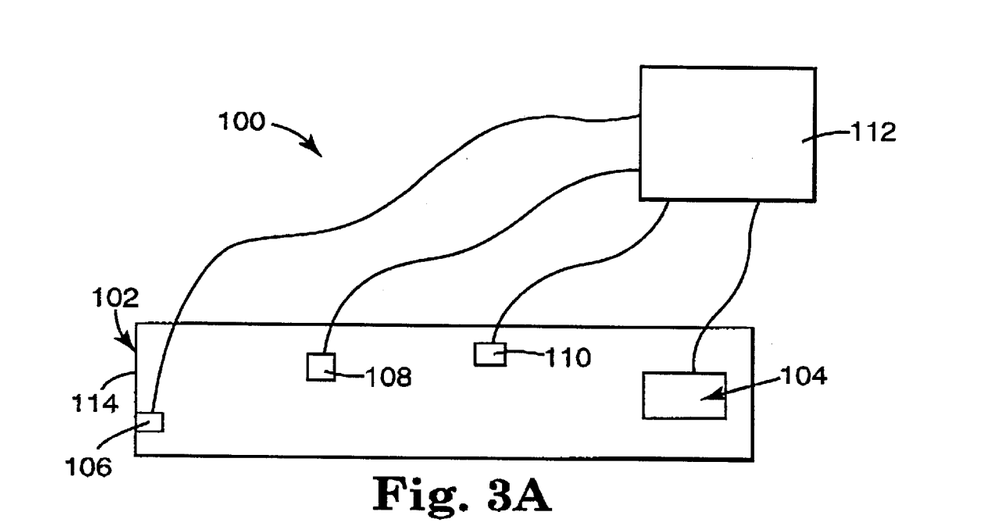
FIG. 3A is a front, schematic view of a first tape drive.

The switches 106–110 are positioned at pre-determined locations and may be mechanical switches, membrane sensors, etc., as known in the art. Regardless, each of the switches 106–110 provides a signal to the processor 112, otherwise connected to and controlling other components of the tape drive 100, such as a drive system and a read/write head. The tape confirmation switch 106 is preferably disposed along a side wall 114 of the frame 102. When contacted, the tape identification switch 106 provides a signal to the processor 112, indicating that the inserted cartridge is not a cleaning tape. Where the tape identification switch 106 is not contacted, the processor 112 is not actively prompted to initiate a tape drive routine.

Similarly, the write-select detection switch 108 indicates to the processor 112 whether information can be written onto the storage tape of the inserted tape cartridge. As with the tape confirmation switch 106, location of the write-select detection switch 108 for the older version tape drive 100 is well-known in the art.

The cartridge present switch 110 is similarly disposed at a trailing end of the frame 102. When contacted, the cartridge present switch 110 provides a signal to the processor 112 indicating the presence of a data storage tape cartridge. Upon receiving this signal or prompt, the processor 112 activates the tape drive 100. Importantly, the cartridge present switch 110 serves as a positive activation switch or sensor. That is to say, even if one or more of the tape confirmation switch 106, the write-select detection switch 108, or any other sensor(s) not shown, are contacted or otherwise activated, if the cartridge present switch 110 is not contacted, the tape drive 100 will not be activated. Thus, a compatible data storage tape cartridge (not shown) will include a relatively complete front (e.g., no notches) so as to contact the cartridge present switch 110 upon insertion into the frame 102.

Figure 3B:
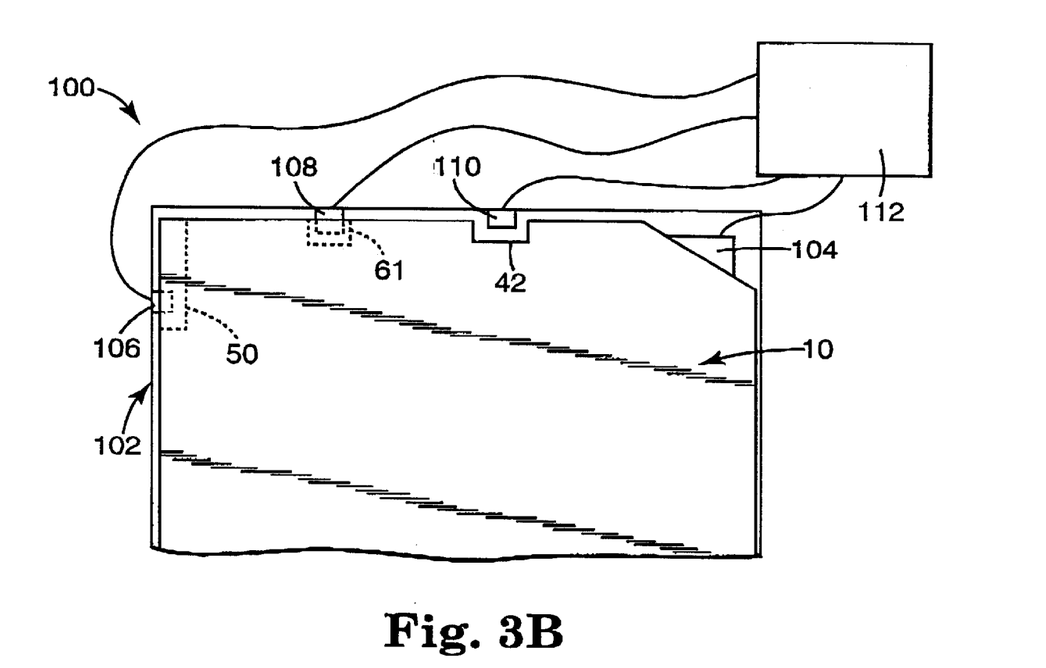
FIG. 3B is a partial top view of the data storage tape cartridge of FIG. 1 inserted into the tape drive of FIG. 3A.

Because the frame 102 of the incompatible tape drive 100 assumes the same form factor size as the data storage tape cartridge 10 (FIG. 1), it may be possible to accidentally load or insert the data storage tape cartridge 10 into the frame 102. However, inclusion of the first misinsertion notch 42 (FIG. 1) prevents the tape drive 100 from being activated. As shown in FIG. 3B, the data storage tape cartridge 10 can be inserted into the frame 102 such that the front 28 is adjacent the various switches 106–110. However, the first misinsertion notch 42 "clears" the cartridge present switch 110. Because cartridge present switch 110 is not contacted, the processor 112 will not signal tape drive 100 activation. Similarly, the tape identification switch 106 and the write-select detection switch 108 are not contacted, with the tape identification notch 50 "clearing" the tape identification switch 106 and the passage 61 formed at the write-select notch 44 (FIG. 1) "clearing" the write-select detection switch 108.

Figure 4A:
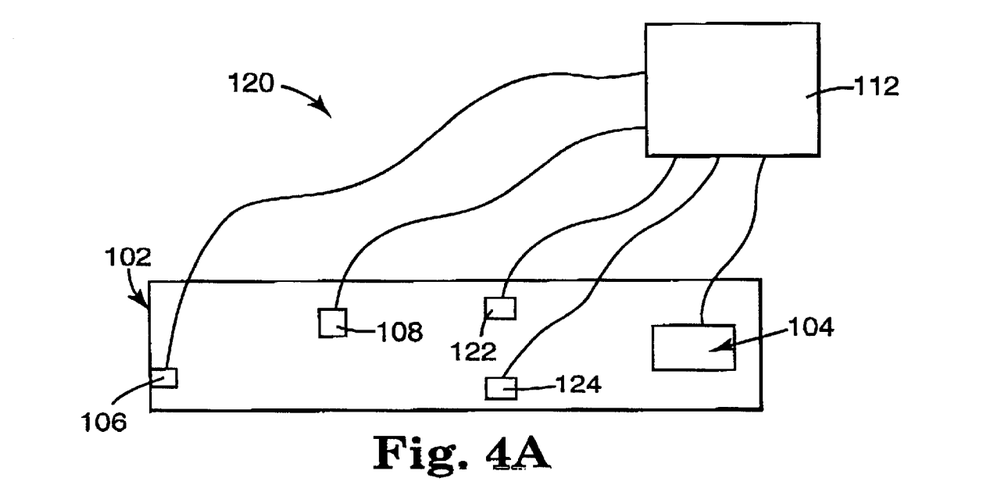
FIG. 4A is a front, schematic view of a second tape drive.

Another commonly available tape drive 120 is depicted schematically in FIG. 4A. The tape drive 120 is essentially a newer version of the tape drive 100 (FIG. 3A), and is incompatible with the data storage tape cartridge 10 (FIG. 1) due to certain features (e.g., reduced storage tape data track height). In addition to one or more upgrades (e.g., an improved read/write head) the tape drive 120 includes many of the same feature as the tape drive 100 (FIG. 3A), with like elements identified by like reference numerals. Thus, the tape drive 120 includes the frame 102, the take-up hub 104, the tape confirmation switch 106, the write-select detection switch 108, and the processor 112. In addition, the tape drive 120 includes a first cartridge present switch 122 and a second cartridge present switch 124.

The first cartridge present switch 122 is located in the same position relative to the frame 102 as the cartridge present switch 110 (FIG. 3A) previously described with reference to the tape drive 100 (FIG. 3A). The second cartridge present switch 124 is positioned directly below the first cartridge present switch 122 (relative to the orientation of FIG. 4A). Each of the cartridge present switches 122, 124 provides a signal to the processor 112 when contacted. In particular, where a signal is received from the first cartridge present switch 122, the processor 112 is positively prompted to prevent activation of the tape drive 120. Conversely, a signal from the second cartridge present switch 124 prompts the processor 112 to activate other components of the tape drive 120. Thus, activation of the tape drive 120 requires both that the first cartridge present switch 122 not be contacted and that the second cartridge present switch 124 be contacted. With this configuration, the tape drive 120 will effectively "reject" a data storage tape cartridge (not shown) otherwise compatible with the tape drive 100 of FIG. 3A as that cartridge will contact the first cartridge present switch 122. Thus, a newer version data storage tape cartridge (not shown) compatible with the tape drive 120 requires that a misinsertion notch be formed in the housing, similar to the first misinsertion notch 42 (FIG. 1) associated with the data storage tape cartridge 10 (FIG. 1) of the present invention. Importantly, however, the misinsertion notch cannot extend to a region of the cartridge housing otherwise corresponding with the second cartridge present switch 124. A cartridge compatible with the tape drive 120 will include a block of material positioned to contact the second cartridge present switch 124, thereby prompting activation of the tape drive 120.

Figure 4B:
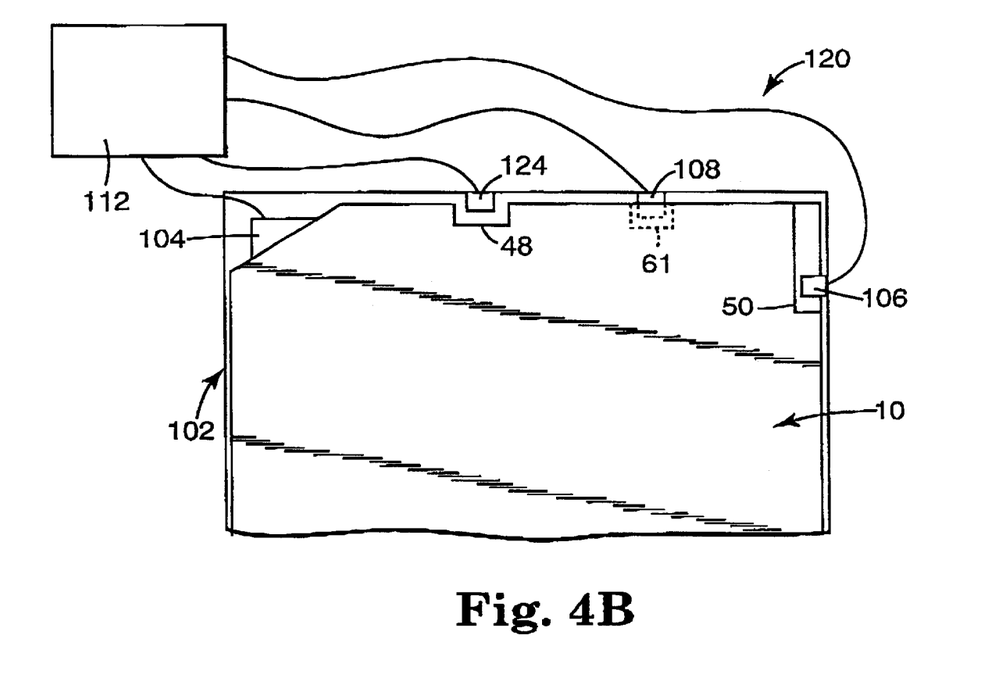
FIG. 4B is a bottom, schematic view of a portion of the data storage tape cartridge of FIG. 1 inserted into the tape drive of FIG. 4A.

According to the example of FIG. 4A, the tape drive 120 is incompatible with the data storage tape cartridge 10 (FIG. 1). Once again, however, due to a form factor sizing of the frame 102 and the data storage tape cartridge 10, it may be possible to accidentally mis-insert the data storage tape cartridge 10 into the frame 102. Were the tape drive 120 to be activated, the tape drive 120 would not perform properly and the data storage tape cartridge 10 and/or the tape drive 120 may be damaged. The second misinsertion notch 48 prevents undesired activation of the tape drive 120 as shown in FIG. 4B. As a point of reference, FIG. 4B depicts a bottom view of the tape drive 120 and the data storage tape cartridge 10. Upon insertion of the data storage tape cartridge 10, the second misinsertion notch 48 extends about or "clears" the second cartridge present switch 124. Because the second cartridge present switch 124 is not contacted, the tape drive 120 is not activated. Similarly, the tape identification notch 106 and the write-select switch 108 are not contacted. It will be understood that the first cartridge present switch 122 is similarly not contacted, due to the first misinsertion notch 42 (FIG. 1) clearing the cartridge present switch 122. As previously described, contacting the first cartridge present switch 122 would positively deactivate the tape drive 120. However, because the second cartridge present switch 124 is not contacted, the tape drive 120 will not be activated.

As should be clear from the above examples, the data storage tape cartridge 10 is configured to prevent undesired activation of at least two highly popular, but incompatible tape drives (e.g., the tape drive 100 and the tape drive 120). Effectively, the first misinsertion notch 42 (FIG. 1) prevents the data storage tape cartridge 10 from activating the tape drive 100 (FIG. 3A), whereas the second misinsertion notch 48 prevents activation of the tape drive 120. Thus, the data storage tape cartridge of the present invention provides a marked improvement over previous designs.

Although the present invention has been described with reference to preferred embodiments, workers skilled in the art will recognize that changes can be made in form and detail without departing from the spirit and scope of the present invention. For example, the data storage tape cartridge has been preferably depicted as assuming a single reel, leader block design. Alternatively, other known configurations including dual reel, mid-tape load, are equally acceptable. Further, the incompatible tape drives described are but two examples of currently available tape drives. Certain features of the data storage tape cartridge (e.g., storage tape configuration, leader block design, etc.) may render the data storage tape cartridge incompatible with other available, similar form factor tape drives that incorporate one or two cartridge present switches. The misinsertion notches of the present invention prevent undesired activation of these incompatible tape drives upon accidental insertion of the data storage tape cartridge.

What is claimed is:

1. A data storage tape cartridge configured to prevent activation of a first incompatible tape drive having a first tape drive switch and of a second incompatible tape drive having a second tape drive switch, a position of the first tape drive switch being different than a position of the second tape drive switch, the data storage tape cartridge comprising:
   a housing defining a top face, a bottom face, a front, a back, and opposing sides, the
      housing forming:
      a tape identification notch extending from the front along one of the opposing sides;
      a write-select notch formed in the front;
      a first cartridge misinsertion notch formed in the front and configured for clearance about the first tape drive switch;
      a second cartridge misinsertion notch formed in the front and configured for clearance about the second tape drive switch;
      a window formed at least partially in the front;
      wherein the first and second misinsertion notches are substantially aligned and spaced from the opposing sides;
   at least one tape reel rotatably disposed within the housing; and
   a storage tape maintained by the at least one tape reel, the storage tape being accessible through the window.

2. The data storage tape cartridge of claim 1, wherein the first and second misinsertion notches combine to form a continuous recess in the front of the housing.

3. The data storage tape cartridge of claim 2, wherein the recess has a width in the range of 9–13 mm.

4. The data storage tape cartridge of claim 2, wherein the recess has a height in the range of 19–23 mm.

5. The data storage tape cartridge of claim 2, wherein the recess has a depth in the range of 3–5 mm.

6. The data storage tape cartridge of claim 1, wherein the first misinsertion notch extends from the top face and the second misinsertion notch extends from the bottom face.

7. The data storage tape cartridge of claim 1, wherein the housing includes a cover and a base, and further wherein the first misinsertion notch is formed in the cover and the second misinsertion notch is formed in the base.

8. The data storage tape cartridge of claim 7, wherein the base and the cover are configured such that upon final assembly, the first misinsertion notch is aligned with the second misinsertion notch.

9. The data storage tape cartridge of claim 1, wherein the data storage tape cartridge includes a single tape reel and further comprises:
   a leader block attached to a leading end of the storage tape.

10. A data storage tape cartridge configured to prevent activation of first and second incompatible tape drives upon insertion of the data storage tape cartridge into either of the incompatible tape drives, the first incompatible tape drive including a first cartridge receiving frame capable of receiving the data storage tape cartridge and a first cartridge present switch, the second incompatible tape drive including a second cartridge receiving frame capable of receiving the data storage tape cartridge and a second cartridge present switch, a position of the first cartridge present switch relative to the first cartridge receiving frame being different than a position of the second cartridge present switch relative to the second cartridge receiving frame, the data storage tape cartridge comprising:

- a housing sized to be received within the cartridge receiving frames, the housing defining
  - a top face, a bottom face, a front, a back, and opposing sides, the housing
  - forming:
    - a tape identification notch extending from the front along one of the opposing sides,
    - a write-select notch formed in the front,
    - a first misinsertion notch formed in the front and configured for clearance about the first cartridge present switch,
    - a second misinsertion notch formed in the front and configured for clearance about the second cartridge present switch,
    - wherein the first and second misinsertion notches are substantially aligned;
- at least one tape reel rotatably disposed within the housing; and
- a storage tape maintained by the at least one tape reel;
- wherein upon insertion of the data storage tape cartridge into the first cartridge receiving
  - frame, the first cartirdge present switch is not contacted such that the first
  - incompatible tape drive is not activated, and further wherein upon insertion of the
  - data storage tape cartridge into the second cartridge receiving frame, the second
  - cartridge present switch is not contacted such that the second incompatible tape
  - drive is not activated.

11. The data storage tape cartridge of claim 10, wherein the first and second misinsertion notches combine to form a continuous recess in the front of the housing.

12. The data storage tape cartridge of claim 10, wherein the housing includes a cover and a base, and further wherein the first misinsertion notch is formed in the cover and the second misinsertion notch is formed in the base.

13. The data storage tape cartridge of claim 10, wherein each of the cartridge misinsertion notches are spaced from the opposing sides.

* * * * *